Patented June 27, 1950

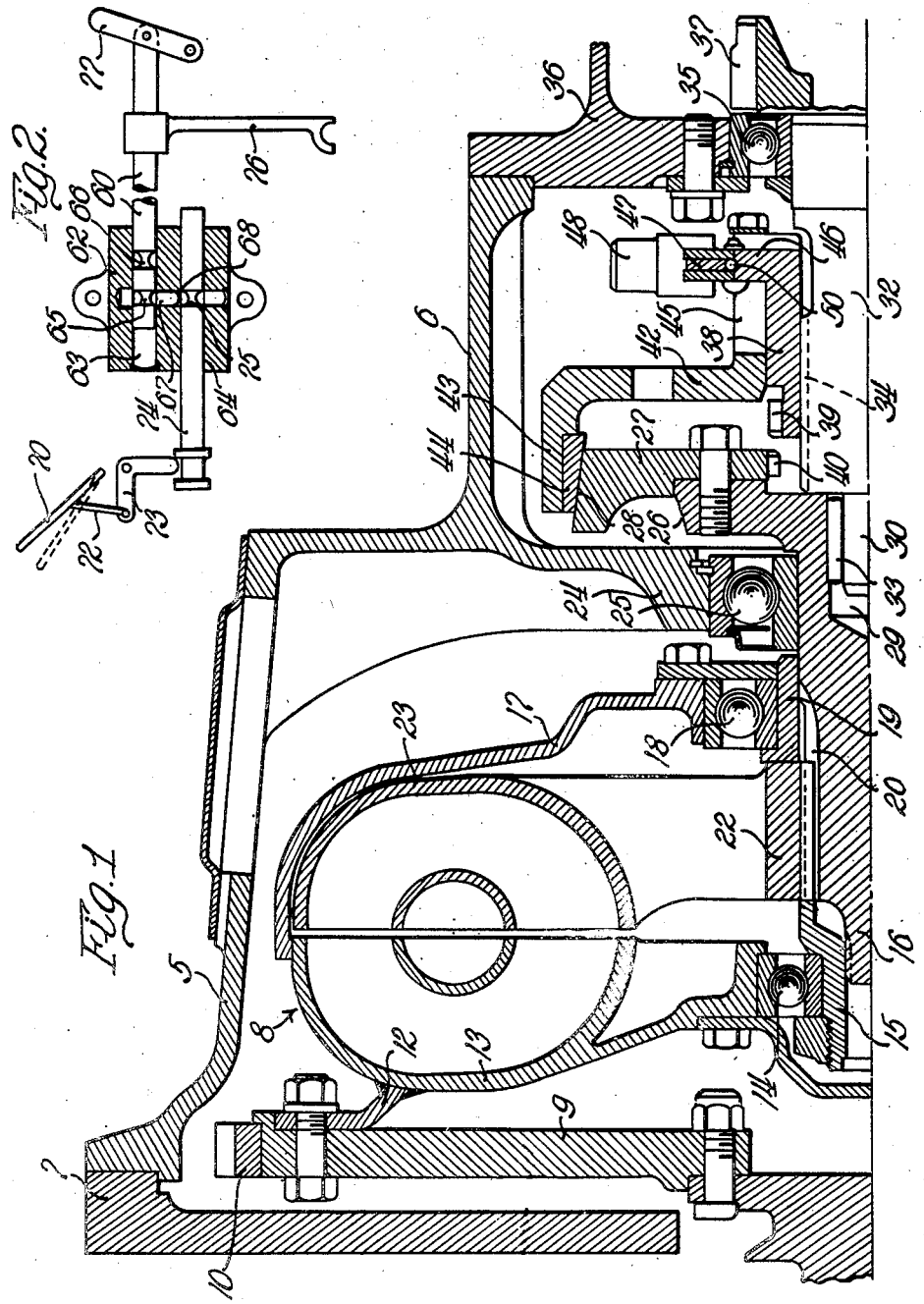

2,512,853

UNITED STATES PATENT OFFICE 2,512,853

FLUID DRIVE WITH SYNCHRONIZING CLUTCH AND CONTROL THEREFOR

Ernest E. Eaton, Berrien Springs, Mich., assignor to Clark Equipment Company, Buchanan, Mich., a corporation of Michigan Application February 4, 1946, Serial No. 645,406

3 Claims. (Cl. 192—.092)

This invention relates to fluid drives, and is more particularly concerned with a fluid drive utilizing a fluid coupling between the power unit and the transmission for vehicles of the automotive type.

It has been found in vehicles of this type that, where a change speed transmission is used in conjunction with a fluid coupling, there is a tendency in such vehicles for the idling torque of the engine to be transmitted through the fluid coupling and interfere with the proper shifting of the gears in the transmission. This is due to the fact that at idling speeds, sufficient transmission of power through the fluid coupling is effected to cause the driving gear to rotate, thereby interfering with shifting operations and requiring extensive use of synchronizers and other types of shifting mechanisms.

One of the primary objects of the present invention is to provide a fluid drive of this type in which the use of synchronizing mechanisms within the change speed gear may be eliminated and, in which means is provided for disconnecting the driven member of the fluid coupling from the drive gear of the transmission to facilitate shifting of the gears without the necessity of encountering the idling torque of the fluid coupling.

In a preferred form of the present invention, I have provided what might be termed an enlarged friction type clutch member between the rotor or driven member of the fluid coupling and the drive gear, which is preferably interlocked with the accelerator pedal in such manner that this clutch can be operated only when the accelerator pedal is in idling position. The interlock provides for releasing the shifting mechanism for the clutch whenever the accelerator pedal is moved to idling position, and does not allow movement of the accelerator pedal until the shift mechanism for the clutch has been shifted into either engaged or released position. Thus the clutch is only operable while the motor is idling, and can only be shifted during this period. Further, the clutch must be in one of its shifted positions before the accelerator pedal is capable of operation.

Other objects and advantages of the present invention will appear more fully from the following detailed description, which, taken in conjunction with the accompanying drawing, will disclose to those skilled in the art the particular construction and operation of a preferred form of the present invention.

In the drawing:

Figure 1 is a sectional view of the fluid coupling and clutch mechanism of the present invention; and Figure 2 is a somewhat diagrammatic view of the interlocking mechanism for the clutch control and accelerator pedal.

Referring now in detail to the drawings, I have disclosed in Figure 1 the housing member 5 which has a reduced portion 6 enclosing the clutch mechanism and the enlarged portion which is piloted on the flywheel housing 7 of the motor which encloses the fluid coupling or clutch indicated generally at 8.

Disposed within the housing 5 is the flywheel 9 having the external starter gear 10, and having secured thereto an annular flange member 12 to which is secured the driving member or impeller 13 of the fluid coupling or clutch 8. This member is journalled at one end by means of the bearing assembly 14 secured on a bushing 15, which in turn is supported upon the end of an intermediate output shaft member or sleeve 16. The opposite portion 17 of the impeller member is journalled by means of the bearing assembly 18 upon the bushing 19 carried in axially spaced relation on the output shaft 16.

Intermediate the bushings 15 and 19 the output shaft 16 is provided with splines 20 for receiving the splined hub portion 22 of the driven member or rotor 23.

The housing 5 is provided with an intermediate wall portion 24 within which is mounted the bearing assembly 25 for journalling the intermediate shaft member 16 driven by the impeller 23 constituting the output shaft of the fluid clutch. This shaft member on the opposite side of the wall 24 is provided with the radial flange 26 to which is secured the disc 27 having the tapered or frusto-conical surface 28. The output shaft 16 also has its outer end counterbored, as indicated at 29, to receive the reduced end 30 of the drive gear shaft 32 which is journalled as by means of the needle bearings 33 within the counterbored portion of the shaft or transmission input shaft 16.

The shaft 32 has an intermediate splined portion 34, and, at its opposite end, is journalled by means of the bearings 35 in the forward end wall of the transmission housing 36. The input shaft 32 extends into the transmission housing 36, and is provided at its outer end with the drive gear 37 for transmitting drive to the gear trains within the transmission.

Mounted on the splined portion 34 of the shaft 32 is a sliding sleeve member 38 which, at one end, is provided with the external clutch teeth 39 adapted to have meshing engagement with the internal clutch teeth 40 of the plate member 27. Journalled about the external surface of the sleeve member 38 is a friction cone ring or synchronizer sleeve indicated generally at 42, having the axially overhanging peripheral portion 43 carrying the friction cone 44 which is adapted to have engagement with the surface 28 of the member 27. The ring or sleeve 42 is provided with axially elongated slots spaced about the circumference thereof, as indicated at 45, through which extend radially directed portions 46 carrying annular ring members 47 forming a yoke or collar upon which is secured the actuator shifting boss 48 adapted to be engaged by a shift fork of conventional design connected to a shift rail, by which the axial shifting of the clutch may be effected. A suitable spring member 50 extends circumferentially between the extensions 46 and the rings 47, and overlies the peripheral surface of the hub portion of the synchronizer ring 42. This spring normally retains the sliding sleeve 38 and the synchronizer sleeve 42 in relative position.

In the position shown in Figure 1, the clutch is disengaged from the shaft 16, and consequently the shaft 32 is not coupled to the fluid clutch so that any idling torque imposed upon the driven member 23 will not be transmitted into the change speed gearing. When it is desired to couple the fluid clutch to the transmission input shaft 32, the actuator 48 is shifted axially to the left from the position shown in Figure 1, and, because of the engagement of spring 50 in the annular groove in the peripheral surface of the hub portion of the synchronizer sleeve 42, moves this ring into frictional engagement with the disc 27 carried by the shaft 16. This causes the shaft 16 and shaft 32 to assume substantially synchronous speeds.

Further shifting of the shift mechanism to the left causes the spring 50 to be deflected out of the annular groove, whereby the sleeve 38 can move independently of the spider or synchronizer sleeve 42 and allow clutch teeth 39 to move into engagement with clutch teeth 40, these constituting the clutch elements of the synchronizer mechanism, and thereby effecting a positive clutch between the shaft 16 and the shaft 32. In uncoupling the input shaft from the fluid coupling, a reverse shifting movement of the shift mechanism first disengages the clutch teeth 39 and 40, and, as the sleeve 38 moves to the position shown, the spring 50 acts to cause the sleeve 42 to move conjointly with the sleeve 38, thereby withdrawing the frictional engagement between the surfaces of members 44 and 27.

In Figure 2, I have disclosed the interlock mechanism by which this shifting of the clutch mechanism is controlled. In this figure, the shift rod for the clutch mechanism is indicated at 60, and is adapted to extend into an interlock block 62 having parallel bored passageways 63 and 64. The passageway 63 receives one end of the shift rod 60, and, adjacent this end the shift rod 60 is provided with two reduced portions 65 and 66, respectively, which cooperate with the interlock pin 67 adapted to have vertical sliding movement through the passageway 68 in the interlock block. The pin 67 is of elongated form, having rounded ends, and, when in the position shown in Figure 2, locks the shifter rod 60 against movement in the unclutched position shown in Figure 1.

A suitable accelerator pedal 70 is provided having linkage connections through the lever 72 and bell crank 73, with one end of an accelerator control rod 74 extending into the passageway 64 of the interlock block. The accelerator control rod 74 is also provided with a reduced portion 75 for receiving an end of the interlock pin when it is moved to a position in which the reduced portion 75 is alined with the passageway 68. Thus, with the accelerator pedal in released or idling position, the reduced portion 75 moves into alinement with the passageway 68, allowing the interlock pin 67 to drop down into this reduced passageway, thereby interlocking the shift rail 60 so as to allow shifting of this rail to the left, as viewed in Figure 2, to move the shifter fork 76 to the left. This control can be exercised manually from any position adjacent the operator, but, for purposes of illustration, there is shown an actuator comprising a shift lever 77 which diagrammatically indicates how the shift rod 60 may be moved. When the shift rod 60 is moved into a position where the reduced portion 66 thereof moves into alinement with passageway 68, the clutch mechanism shown in Figure 1 is shifted into engaged position, coupling the rotor of the coupling with the drive gear. The accelerator pedal can then be depressed inasmuch as the interlock pin will be cammed upwardly into the recess 66 of the shift rail 60. This locks the clutch mechanism against disengagement during the time that the accelerator pedal is in operative position. In order to declutch the mechanism, it is necessary that the accelerator pedal be returned to idling position to again shift the shift rail 60 in reverse direction to provide the desired uncoupling action.

It will be apparent that by the provision of this interlock, it is impossible to shift the clutch from engaged to disengaged position, or vice versa, except when the accelerator control rod has been moved to idling position, and that once shifted in such position, it is possible to shift the clutch mechanism into either of its limiting positions. However, when the accelerator rod 74 is moved out of idling position, the clutch mechanism is locked in the selected shifted position and cannot be again shifted until idling position is attained by the rod 74.

Thus, it will be apparent that when the vehicle is underway with the accelerator partially or fully depressed, it is impossible to disconnect the driving train from the fluid coupling, but that when the vehicle accelerator has been moved to idling position, it is possible to uncouple the fluid coupling from the transmission to allow easy shifting of the gears in the transmission without any influence of the idling torque in the fluid coupling.

I am aware that various changes may be made in certain of the details of the invention herein shown and described, and therefore, I do not intend to be limited except as defined by the scope and spirit of the appended claims.

I claim:

1. In combination, in a vehicle having an accelerator, a fluid driven member having an output shaft, a power shaft, clutch elements on each of said shafts, and means for controlling the engagement and disengagement of said clutch elements including a first shifter rod, a second shifter rod responsive to accelerator position, and interlock means therebetween for preventing actuation of said first rod unless said second rod is in accelerator idling position.

2. In combination, in a vehicle having an accelerator, a control rod actuated thereby, a fluid clutch, a shaft driven thereby, a transmission input shaft coaxially alined with said driven shaft, synchronizing clutch means between said shafts operable to couple said shafts together, an actuator for said clutch means including a shift rod and interlock means between said accelerator control rod and said shift rod for preventing movement of said rod unless said accelerator control rod is in accelerator idling position.

3. The combination, in a vehicle having a fluid clutch, a transmission, and an accelerator control rod, of synchronizer type clutch means between the fluid clutch and said transmission, an actuator for said clutch means, and interlocking means between said actuator and said rod for permitting the shifting of said clutch actuator only when said rod is in accelerator idling position.

ERNEST E. EATON.

REFERENCES CITED

The following references are of record in the file of this patent:

UNITED STATES PATENTS

| Number | Name | Date |
|---|---|---|
| 2,076,362 | Boldt et al. | Apr. 6, 1937 |
| 2,163,895 | Staples | June 27, 1939 |
| 2,319,740 | Lapsley et al. | May 18, 1943 |
| 2,320,116 | Avila | May 25, 1943 |
| 2,349,297 | Neracher et al. | May 23, 1944 |
| 2,351,485 | Conkle | June 13, 1944 |